July 2, 1946. H. J. DE N. McCOLLUM 2,402,971
BURNER
Filed Oct. 16, 1942 2 Sheets-Sheet 1
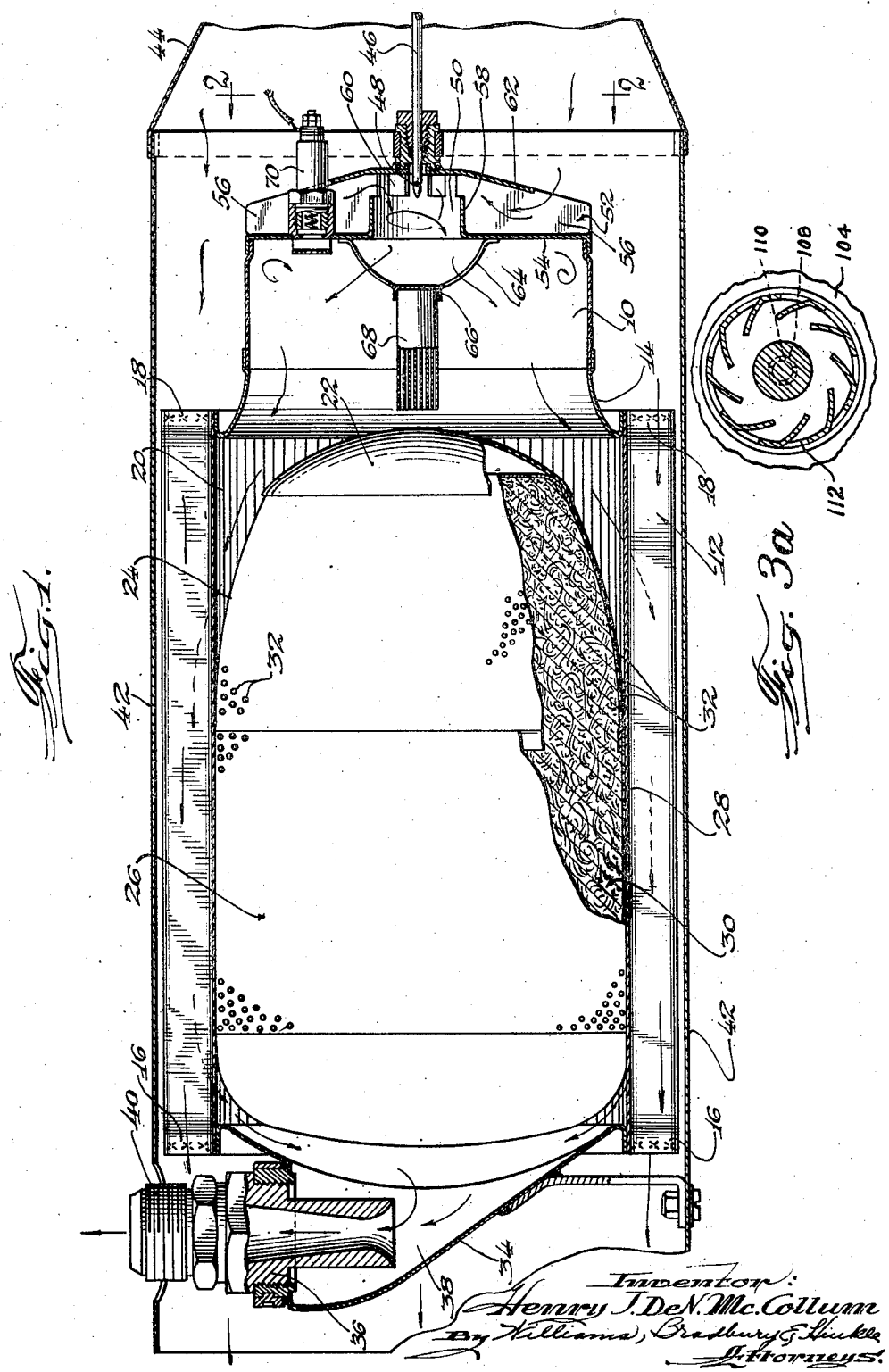
Inventor:
Henry J. DeN. McCollum
By Williams, Bradbury & Hinkle
Attorneys.

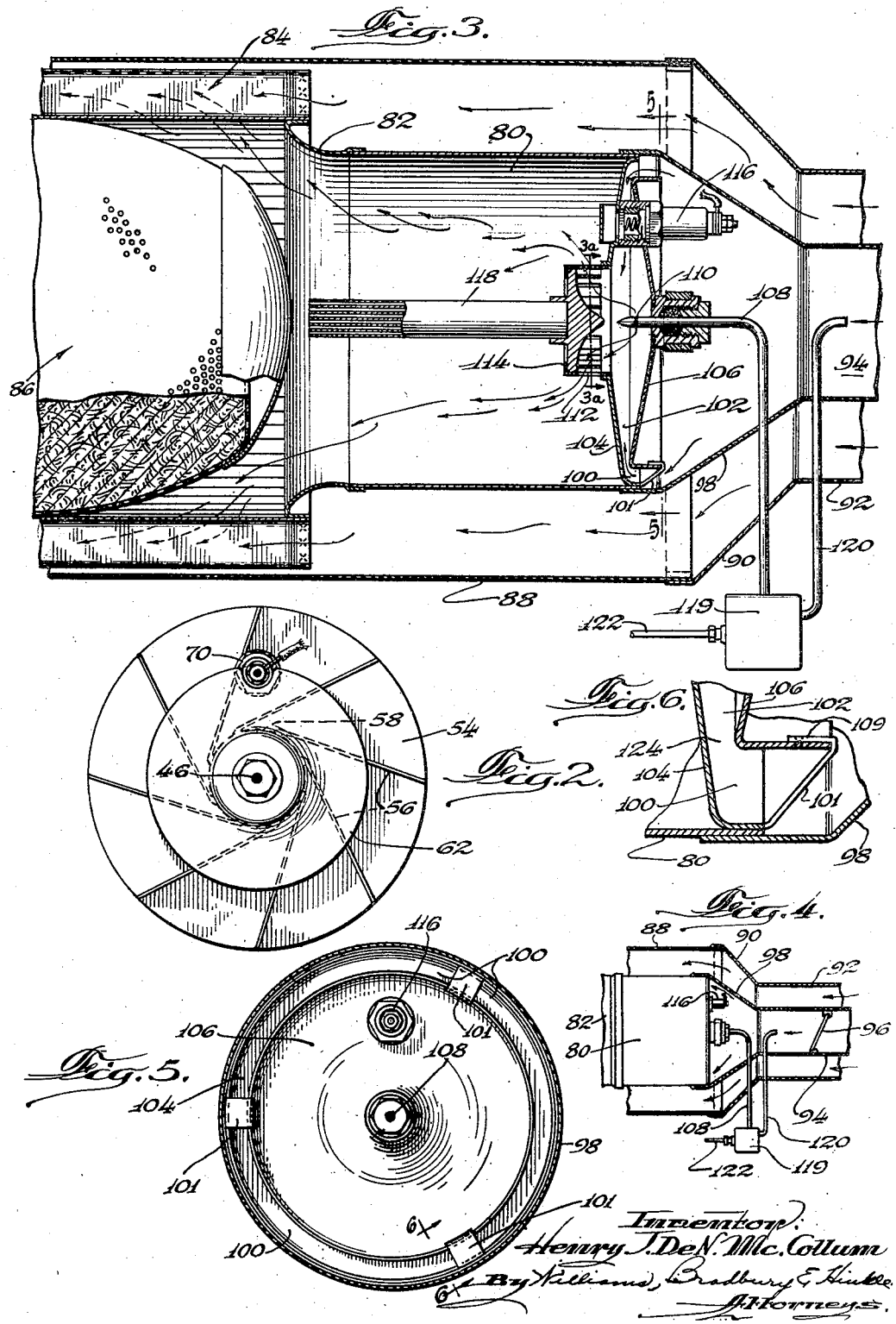

Patented July 2, 1946

2,402,971

UNITED STATES PATENT OFFICE 2,402,971

BURNER

Henry J. De N. McCollum, Chicago, Ill.; Thelma McCollum executrix of said Henry J. De N. McCollum, deceased Application October 16, 1942, Serial No. 462,231

7 Claims. (Cl. 158—28)

My invention relates to burners and more particularly to means for improving the combustion in burners of the kind used in aircraft heaters and for similar purposes.

An object of my invention is to provide a burner of the kind adapted for use in aircraft heaters and having new and improved means for providing a more intimate and homogeneous mixture of the fuel and air.

Another object of my invention is to provide burner carbureting means wherein the air to be mixed with fuel is preheated to provide a more intimate and improved combustible mixture.

Another object of my invention is to provide a burner having novel means for producing a whirling motion in the combustion air prior to its mixture with the fuel to produce a more homogeneous mixture of the fuel and air.

Another object of my invention is to provide a burner having new and improved carbureting means which is light, compact and inexpensive and which enhances the efficiency of the burner without materially increasing its cost or weight.

Other objects and advantages will become apparent as the description proceeds.

In the drawings:

Fig. 1 is a view showing a longitudinal section of an aircraft heater embodying one form of my invention;

Fig. 2 is an end view of the carburetor structure of Fig. 1 and is taken on the line 2—2 of that figure;

Fig. 3 is a view showing a partial, longitudinal section of an aircraft heater embodying a second form of my invention; Fig. 3A is a transverse section taken on the line 3A—3A of Fig. 3;

Fig. 4 is a view on a reduced scale showing the manner in which the air is supplied to the carbureting means and the heat transfer means of Fig. 3;

Fig. 5 is an end view of the carbureting means of Fig. 3 and is taken on the line 5—5 of that figure; and Fig. 6 is a view showing a detail and is taken on the line 6—6 of Fig. 5.

In the embodiment of Figs. 1 and 2, I have illustrated an aircraft heater comprising, in general, a combustion chamber 10 for supplying hot products of combustion to one end of a tubular heat exchanger 12 to which the combustion chamber 10 is connected by way of an outwardly flaring plate 14. The heat exchanger 12 has hollow fins extending lengthwise thereof and the interiors of these hollow fins form longitudinally extending passages for the hot products of combustion delivered to the heat exchanger by the combustion chamber. The ends of the hollow fins are pinched together and sealed by welding or in any other suitable manner, as indicated at 16 and 18, to close the ends of the passages in the hollow fins.

The hot products of combustion from the combustion chamber 10 flow through a tapered annular passage 20 surrounding the nose 22 and tapered end 24 of a muffler 26 which is located in the heat exchanger 12. The muffler has a sheet metal shell 28 containing sound absorbing material 30, such as glass wool or stainless steel wool. Openings 32 in the muffler shell form acoustic couplings between the gas passages and the interior of the muffler and permit the sound to pass into the glass wool and be absorbed thereby.

The end of the tubular heat exchanger 12 which is opposite to the combustion chamber 10 is closed by a plate 34 supporting an outlet fitting 36. A discharge chamber 38 is located between the plate 34 and the adjacent end of the muffler 26 and receives the products of combustion after they have given up their heat to the heat exchanger 12. These cooled products of combustion are then discharged to atmosphere through the outlet fitting 36 and any suitable exhaust pipe connected to the threaded end 40 of this fitting.

The tubular heat exchanger and other parts thus far described are enclosed in a cylindrical casing 42 which cooperates with the heat exchanger 12 to form ventilating air passages between and around the hollow fins. The right-hand end of the casing 42 is connected to an air inlet 44 which is supplied with air by a ram, blower, or other suitable air circulating means. The ventilating air absorbs heat from the heat exchanger 12 and is discharged from the left-hand end of the casing 42 into the aircraft cabin or other space to be heated or into ventilating ducts for conducting this air to selected locations.

I have provided novel carbureting means for supplying a homogeneous, combustible mixture to the combustion chamber 10. The fuel for this carbureting means is furnished by way of a fuel supply pipe 46 having outlet openings 48 located in the cylindrical chamber 50 of my novel carbureting means. The pipe 46 is connected with a pump or other suitable means which supplies the fuel thereto under pressure at a rate which may be varied to conform to the particular conditions under which the heater is operating. An appropriate pumping apparatus is diagrammatically indicated in Fig. 3 and will be referred to more specifically in a description of the embodiment shown in that figure.

The chamber 50 is located in a structure 52 having a wall 54 which forms the end wall of the combustion chamber 10. A plurality of vanes 56 are arranged tangentially with the cylindrical wall 58 of the chamber 50, as most clearly shown in Fig. 2, and serve to direct combustion air into this chamber through openings 60 in cylindrical wall 58.

A circular baffle 62 forms a part of the structure 52 which is in the form of a casting including the end wall 54, the cylindrical wall 58, and the tangentially arranged vanes 56. The baffle 62 prevents the air from entering the spaces between the vanes 56 at a point adjacent the openings 60 leading to the mixing chamber 50. The air which eventually reaches this chamber, therefore, must enter the spaces between the vanes 56 adjacent the outer ends thereof and flow inwardly to the openings 60 leading to the mixing chamber 50. This particular arrangement serves a dual purpose in that the longer travel of the air in contact with the vanes 56 and wall 54 preheats this air before it enters the mixing chamber 50. This heated air is flowing in directions tangential to the cylindrical wall 58 of the mixing chamber 50 and enters this mixing chamber with a whirling motion which produces a better intermixing of the air and fuel and this flow arrangement cooperates with the preheating of the air to form a homogeneous, highly combustible mixture in the mixing chamber 50.

The combustible mixture formed in the mixing chamber 50 passes into the combustion chamber 10 through the openings 64 in a spider 66 which supports a re-igniter 68. The combustible mixture initially entering the combustion chamber 10 is ignited by one or more electrical igniters 70 mounted in the wall 54. The igniter 70 is connected to a suitable source of electrical energy by way of a thermostatic switch which disconnects the igniter from its source when the heater attains normal operating temperature. The re-igniter 68 is provided to insure maintenance of combustion after the igniter 70 has been disconnected from its source of current.

In Figs. 3A, 4 and 5, I have illustrated a modified form of my invention wherein the heater has a combustion chamber 80 connected by a flared, annular plate 82 to one end of a hollow fin heat exchanger 84 which may be identical with the heat exchanger 12 of the preferred embodiment. A muffler 86 is located in the heat exchanger 84 and this muffler 86 may likewise be identical with the muffler 26 of the previous embodiment. In fact the heater of Figs. 3, 4 and 5 may be identical with the heater of Fig. 1, except for differences herein shown or described.

The heat exchanger 84 is heated by the hot products of combustion flowing lengthwise of the hollow fins and transfers this heat to ventilating air flowing between the heat exchanger 84 and a cylindrical casing 88 which surrounds the heat exchanger and combustion chamber. The lefthand end of the casing 88 may open directly into the aircraft cabin or other space to be heated or may discharge the heated ventilating air into a system of ducts for conducting this air to selected locations. The righthand end of the cylindrical casing 88 is connected to the conical end 90 of an air inlet 92 into which air is forced by a ram, blower, or any other suitable air circulating means.

Part of the air forced into the inlet 92 enters a combustion air inlet 94 which is located in the inlet 92, as best shown in Fig. 4. A check valve 96 of the gravity operated type is located adjacent the entrance to inlet 94 and prevents any fuel vapors or burned gases from escaping from the combustion air inlet 94 and mixing with the ventilating air. This feature is claimed in my co-pending application, Serial No. 460,969, filing date October 6, 1942, and requires no further discussion herein.

The combustion air which flows past the check valve 96 enters a conical extension 98 of the combustion inlet 94 and then passes through the three arcuate inlet openings 100 leading to a heating and mixing chamber 102. The chamber 102 is formed between sheet metal plates 104 and 106, which are secured together by fingers 107 forming integral extensions of the plate 104. These fingers have reversely bent ends 109 which may be welded, soldered, or otherwise attached to the plate 106.

Fuel is supplied to the mixing chamber 102 by a fuel supply pipe 108 having outlet openings 110 at approximately the center of the chamber 102. The fuel is ejected from the openings 110 under pressure and in the form of a fine spray which mixes with the heated air in the chamber 102 to form a combustible mixture. This combustible mixture passes through the tangentially arranged openings 112 in a burner tube 114 and is given a whirling motion as it enters the combustion chamber 80. This whirling motion increases the homogeneity of the mixture so that the combustion chamber receives a uniform, highly combustible mixture which is ignited by one or more electrical igniters 116. A suitable reigniter 118 is illustrated as being mounted on the burner tube 114.

Fuel is forced into the fuel supply pipe 108 by a pumping apparatus 119 whose rate of fuel discharge is responsive to atmospheric pressure and to the velocity head of the air stream in the combustion inlet 94. A pipe 120 has its lower end connected to the pumping apparatus 119 and its upper end located in the combustion air inlet 94 and directed toward the entrance to this inlet. A pipe 122 connects the pumping apparatus 119 with a fuel tank or other suitable source of fuel supply. The pumping apparatus 119 may be of any of the usual kinds commonly used in connection with aircraft engine carburetors and since the details of this pumping apparatus form no part of my invention, further description is unnecessary.

The plates 104 and 106 which form the mixing and heating chamber 102 provide a relatively narrow entrance 124. For example, this entrance may have a width of only one-eighth of an inch, whereas the width of the heating and mixing chamber 102 opposite the inner edge of the plate 104 may be three-eighths of an inch. The crowding of the air through this narrow entrance, together with the right angle turn which the air must take in flowing into this entrance, creates a turbulence in the air as it enters the chamber 102 which helps in forming a homogeneous mixture between this air and the fuel sprayed from the openings 110 in fuel pipe 108. This turbulence increases the absorption of heat by the air from the plate 104 which also forms one wall of the combustion chamber 80. The mixture formed in the chamber 102 is given a whirling motion by the tangentially arranged parts at the openings 112 in the burner tube as this mixture passes into the combustion chamber and this whirling motion increases the homogeneity of the mixture and improves the vaporization of the fuel therein.

Both embodiments of my invention have been designed to provide adequate preheating of the combustion air and provision for homogeneous mixing of the air and fuel. These objects have been accomplished by means of simple structures which may be easily manufactured and assembled by mass production methods without adding materially to the weight of the heater. My invention, however, is not limited to the particular details illustrated and described but may assume numerous other forms and is to be construed as including all modifications and variations falling within the scope of the appended claims.

I claim:

1. In apparatus of the class described, the combination of a combustion chamber having an end wall formed of material of high heat conductivity and exposed throughout substantially its entire area to the heat in said chamber and having an opening therethrough, a second wall spaced from said first-named wall, said walls cooperating to form an air passage therebetween along the outer face of said end wall, said air passage having an inlet adjacent the periphery of said first-named wall, means for feeding liquid fuel into said air passage for mixture with the air therein for movement through said opening into said combustion chamber and means for giving a whirling motion to the air and fuel entering the combustion chamber.

2. In apparatus of the class described, the combination of a combustion chamber having a circular end wall, a second wall spaced from said end wall and cooperating therewith to form a plurality of air inlet openings arranged about the periphery of said first-named wall, means for admitting liquid fuel to the space between said walls for mixing with air entering said inlet openings, a tubular member about an opening through said first named wall providing communication between said space and said combustion chamber, and means comprising tangentially arranged walls for causing said mixture of air and fuel to have a whirling motion in said combustion chamber.

3. In apparatus of the class described, the combination of a combustion chamber having a circular end wall, a second wall of smaller diameter spaced from said first-mentioned wall, means forming a cylindrical mixing chamber located between said walls, tangential vanes between said walls for directing combustion air tangentially into said mixing chamber, and means for supplying fuel to said mixing chamber for atomization and mixture with the air in said chamber, said second wall and vanes being integral with said end wall.

4. Apparatus of the class described, comprising a cylindrical combustion chamber having an end wall exposed throughout substantially its entire area to combustion occurring in said chamber, said end wall being composed of material having a high coefficient of heat conductivity, a second wall spaced from said end wall to form a mixing chamber, said walls cooperating to form combustion air inlets adjacent the edge of said end wall and a passage in heat transmitting contact therewith, said passage communicating with said combustion chamber and said inlets, liquid fuel supply means discharging intermediate said walls for atomization and mixture of the fuel with the air in said mixing chamber, and means for giving a whirling motion to air entering said combustion chamber.

5. In a heater of the class described, the combination of a combustion chamber having a circular end wall, a second wall spaced from said first named wall, said walls bulging in opposite directions adjacent their central portions and cooperating to form therebetween a passage of variable width for combustion air, said passage having an inlet adjacent the periphery of said first named wall, liquid fuel supply means discharging intermediate said walls at approximately the widest part of said passage for atomization and mixture of the fuel with the air in said passage, said passage being in communication with said combustion chamber, and means for giving a whirling motion to the air and fuel mixture supplied to said combustion chamber.

6. In apparatus of the class described, the combination of a cylindrical combustion chamber having a circular end wall of high heat conductivity and provided with an opening therethrough at its central portion, a second wall spaced from said end wall and cooperating therewith to form an air inlet passage of varying width, means for delivering liquid fuel to said passage coaxially with the opening in said end wall, an electrical igniter mounted in said end wall and having an axis parallel to the axis of said end wall, a re-igniter coaxial with said end wall, a support for said re-igniter, said support being attached to said end wall and provided with openings connecting said combustion chamber with said passage, and fluid guiding means for causing combustible mixture supplied to said combustion chamber to have a whirling motion about the axis of said re-igniter.

7. In an apparatus of the class described, the combination of a combustion chamber having an end wall provided with an opening, a plate at the end of said combustion chamber in outwardly spaced relation to said end wall and shaped so as to cooperate with said end wall for enclosing a substantial space with comparatively narrow inlet openings thereinto about the periphery of the plate, a tubular member connected with said end wall about the opening therein, means for spraying fuel into said tubular member for atomization and mixture with the air in said member, and means comprising tangentially arranged walls for causing said mixture of air and fuel to have a whirling motion in said combustion chamber.

HENRY J. De N. McCOLLUM.